Figure 1:
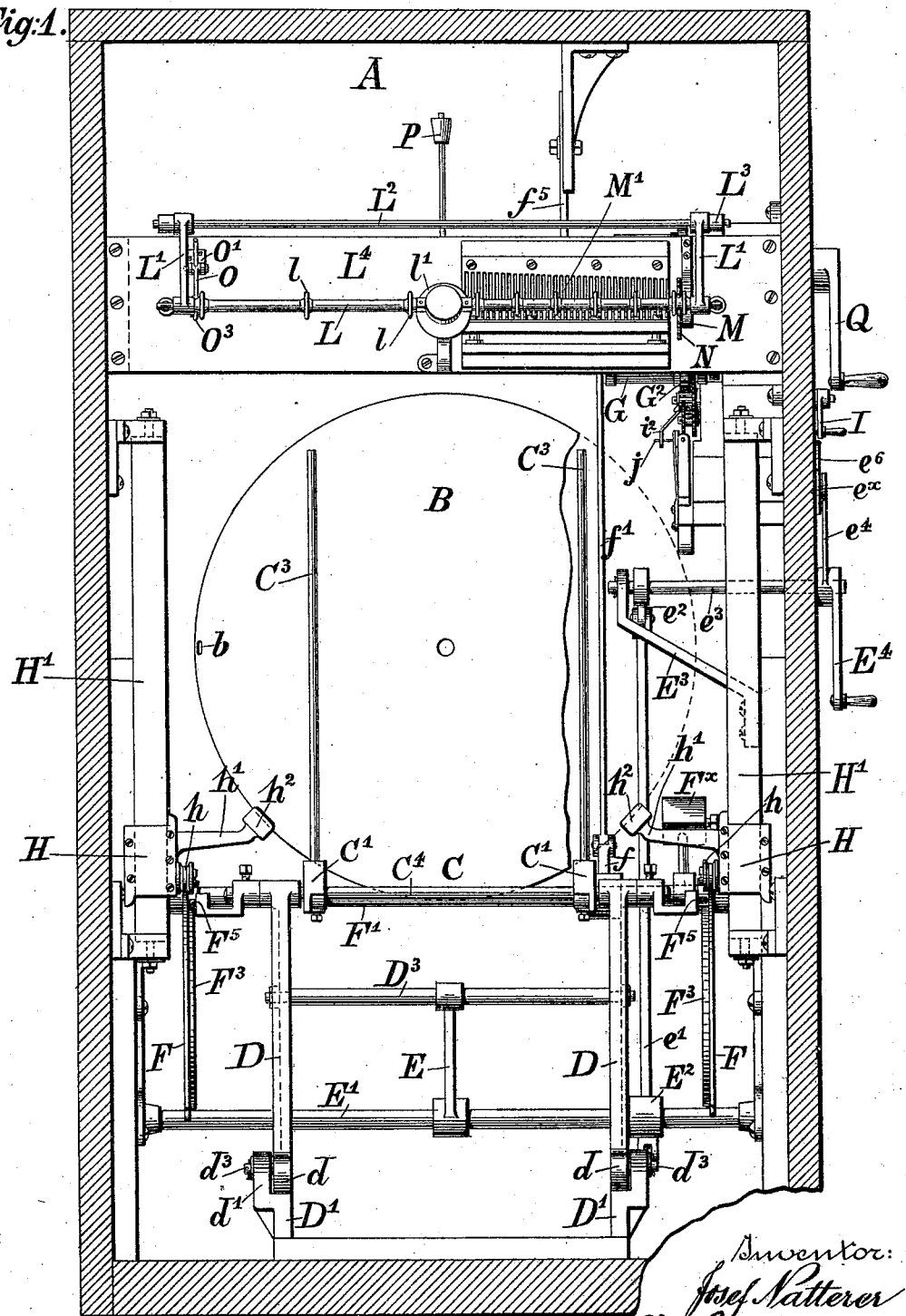

No. 688,541. Patented Dec. 10, 1901.
J. NATTERER.
MUSIC BOX WITH EXCHANGEABLE NOTE SHEETS.
(Application filed Feb. 20, 1901.)
(No Model.) 7 Sheets—Sheet 1.

No. 688,541. Patented Dec. 10, 1901.
J. NATTERER.
MUSIC BOX WITH EXCHANGEABLE NOTE SHEETS.
(Application filed Feb. 20, 1901.)
(No Model.) 7 Sheets—Sheet 3.

No. 688,541. Patented Dec. 10, 1901.
J. NATTERER.
MUSIC BOX WITH EXCHANGEABLE NOTE SHEETS.
(Application filed Feb. 20, 1901.)

(No Model.) 7 Sheets—Sheet 4.

Witnesses:
John T. Rennie
Geo. L. Wheelock

Inventor:
Josef Natterer
By Lowell Wable
Attorneys.

No. 688,541. Patented Dec. 10, 1901.
J. NATTERER.
MUSIC BOX WITH EXCHANGEABLE NOTE SHEETS.
(Application filed Feb. 20, 1901.)
(No Model.) 7 Sheets—Sheet 5.
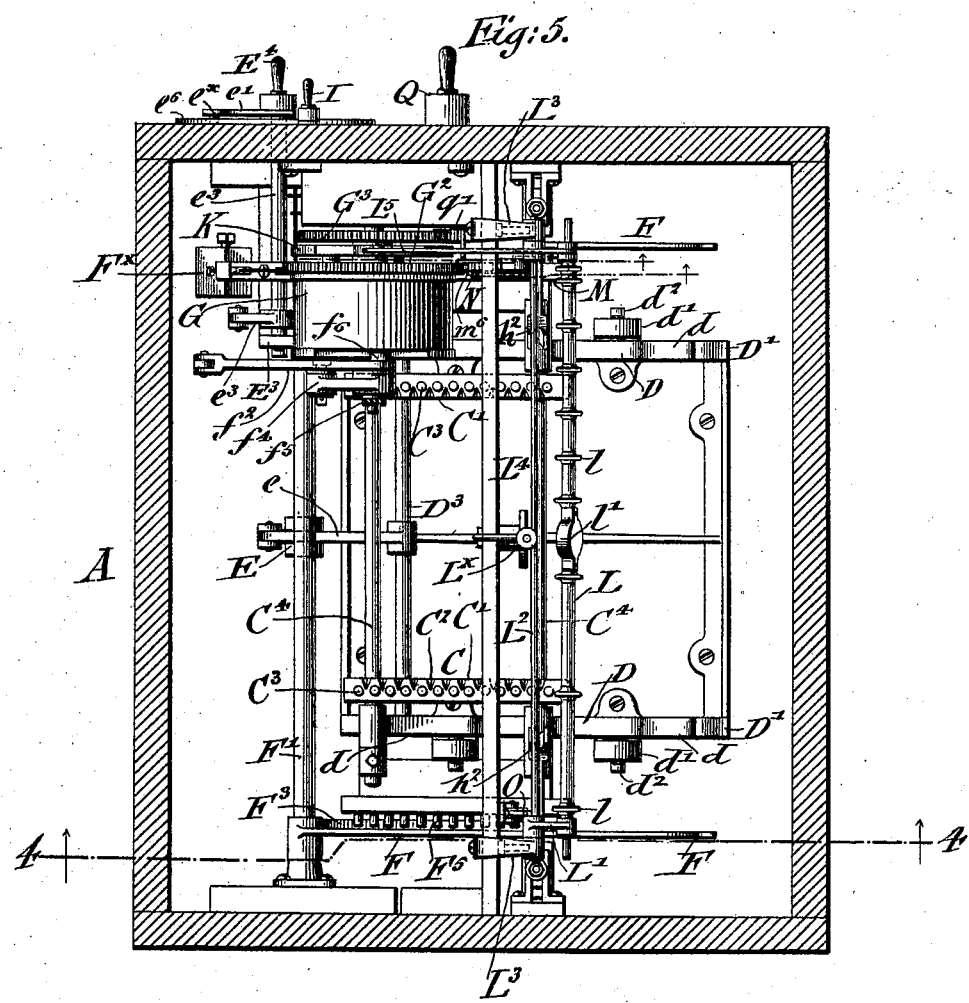
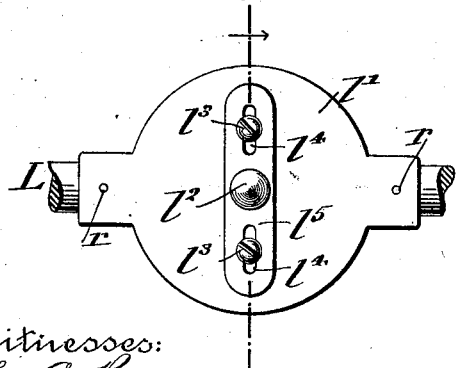
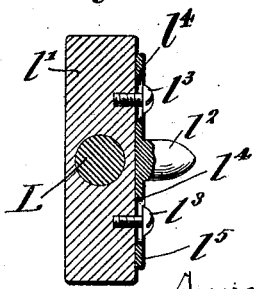

No. 688,541. Patented Dec. 10, 1901.
J. NATTERER.
MUSIC BOX WITH EXCHANGEABLE NOTE SHEETS.
(Application filed Feb. 20, 1901.)
(No Model.) 7 Sheets—Sheet 6.
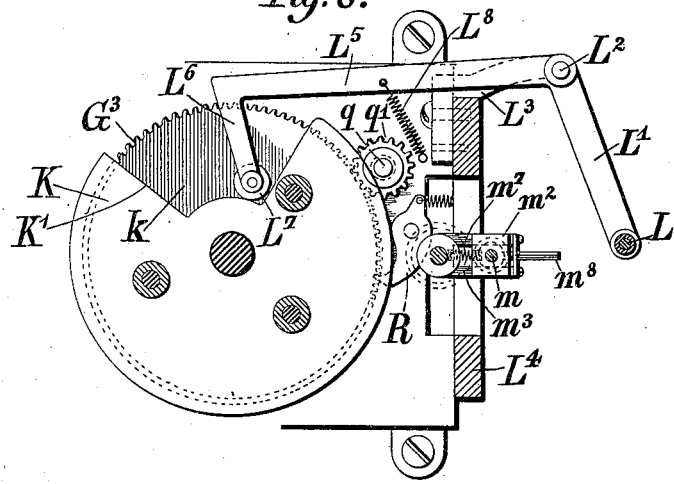
Fig: 8.
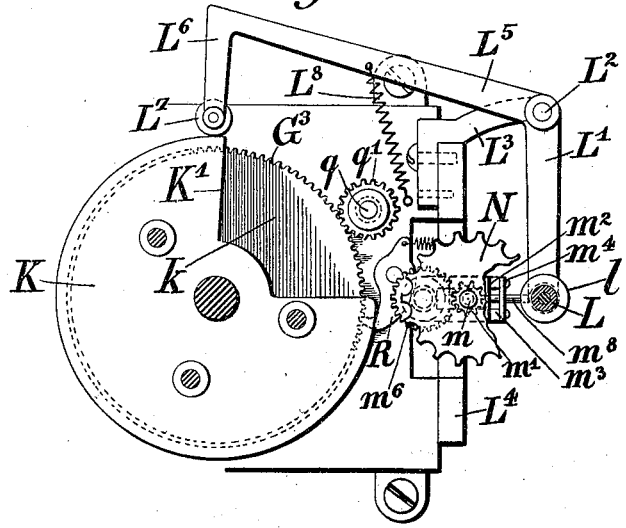
Fig: 9.
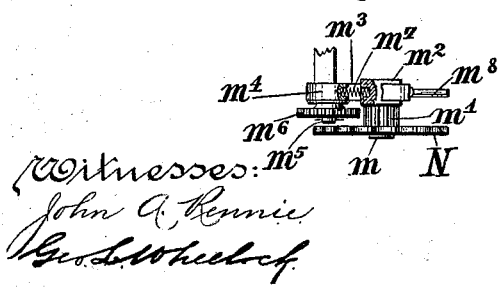
Fig: 10.
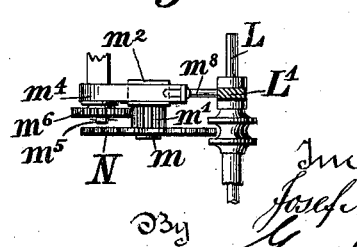
Fig: 11.
Witnesses:
John A. Rennie
Geo. L. Wheelock
Inventor:
Josef Natterer
By
Attorneys.
THE NORRIS PETERS CO., PHOTO-LITHO., WASHINGTON, D. C.

No. 688,541. Patented Dec. 10, 1901.
J. NATTERER.
MUSIC BOX WITH EXCHANGEABLE NOTE SHEETS.
(Application filed Feb. 20, 1901.)

(No Model.) 7 Sheets—Sheet 7.

WITNESSES:
John A. Rennie
Geo. L. Wheelock

INVENTOR
Josef Natterer
BY
Gowen Wahle
ATTORNEYS

UNITED STATES PATENT OFFICE.

JOSEF NATTERER, OF JERSEY CITY, NEW JERSEY, ASSIGNOR TO PERFECTION MUSIC-BOX COMPANY, OF NEWARK, NEW JERSEY, A CORPORATION OF NEW JERSEY.

MUSIC-BOX WITH EXCHANGEABLE NOTE-SHEETS.

SPECIFICATION forming part of Letters Patent No. 688,541, dated December 10, 1901.

Application filed February 20, 1901. Serial No. 48,101. (No model.)

*To all whom it may concern:*

Be it known that I, JOSEF NATTERER, a citizen of the United States, residing at Jersey City, in the county of Hudson and State of New Jersey, have invented certain new and useful Improvements in Music-Boxes with Exchangeable Note-Sheets, of which the following is a specification.

My invention relates to that class of music-boxes or similar mechanical musical instruments which are provided with exchangeable note-sheets—that is to say, with a set of note-sheets arranged in the instrument so that one or the other of them may be selected and played and which note-sheets are shifted by two angularly-disposed movements before the selected note-sheet is in playing position. Heretofore it has been proposed in said class of musical instruments to shift the note-sheets automatically after they have been selected from their position of rest in the instrument to playing position; but it has been found in practice that music-boxes of this sort, which are entirely automatic in their action and are very complex in their construction, are very liable to get out of repair, and hence require assiduous attention.

The main object of the present invention is to simplify and render more durable and efficient music-boxes of the described class and to provide an economical and practical means whereby the note-sheets are moved to position which must first be obtained before the selected and transversely-shifted note-sheet is separated from the set and moved to playing position. After the selected note-sheet has been moved with the others and bodily shifted transversely it is adapted to be separated from the set while the magazine is positively locked against movement and moved automatically to playing position upon the release of the governor, after which the selected and withdrawn note-sheet is automatically secured in playing position and the piece of music played by the instrument. By the described operation I am enabled, as stated, to greatly simplify the construction and manner of operating the instrument.

Further objects of the invention are to simplify the means for supporting the series of note-sheets and to provide a safety device for the purpose of preventing any racking of or injury to the parts, such as the star-wheels, while the note-sheet is being moved to playing position and for the purpose of causing the note-sheet to be properly centered in playing position.

To these ends my invention consists, first, of a music-box with exchangeable note-sheets in which the note-sheets are supported in a set or series in a suitable magazine movable substantially in one plane, oscillatory supports for the magazine, and means for operating the said supports so as to shift the magazine and the set of note-sheets bodily to position, so that the selected note-sheet may be moved from its transversely-shifted position to playing position.

The invention consists, also, of peculiarly-constructed setting means for centering the magazine or holder for the note-sheets in such a way as that just prior to the shifting of the note-sheet to playing position the pointer or index will be automatically set and locked directly opposite the number designating the piece of music which is to be performed in all cases where the said pointer is nearer that number than any other number. Through this precautionary device no other piece than the piece of music selected will be played if ordinary precautions be taken.

The invention further consists of a note-sheet, means for shifting the same to playing position, and the driver or spur-wheel in combination with a spring fixed to the music-comb support and projecting in advance of and located in juxtaposition to the driver or spur-wheel, so as to temporarily hold the note-sheet out of contact with the said driver.

The invention further consists of the combination of the motor and its driven pinion, a stationary guide-piece located near said pinion, a spring-actuated box sliding in said guide-piece and provided with an actuating-pin projecting through one end of said box, a pinion mounted on said box and maintained normally out of engagement with the other pinion, a note-sheet driver or spur-wheel carried by the shiftable pinion, and means for engaging said projecting pin so as to shift the note-sheet driver or spur-wheel; and the invention further consists of certain other features of construction and combinations of parts to be hereinafter described, and then particularly pointed out in the claims.

Figure 2:
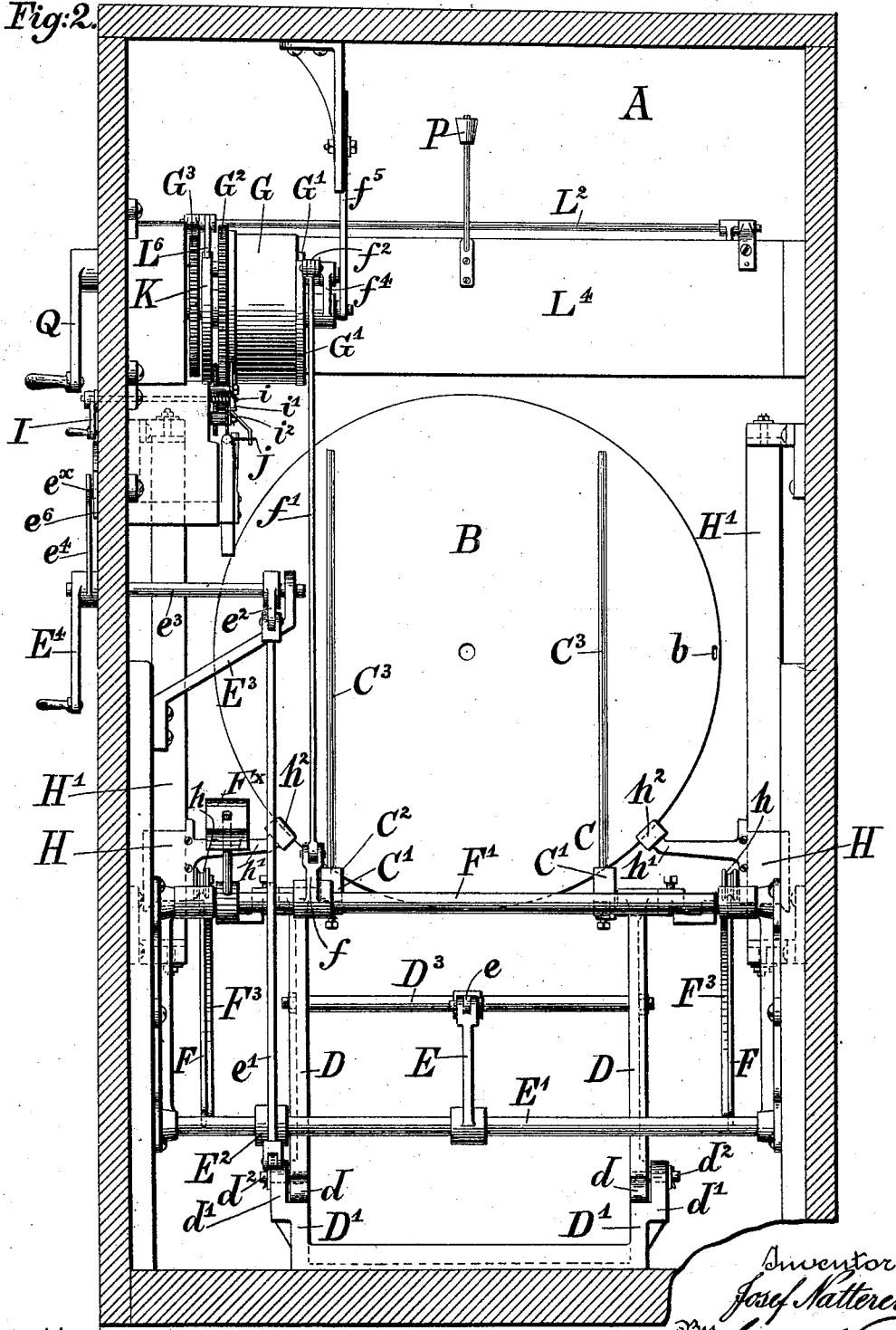
Figure 3:
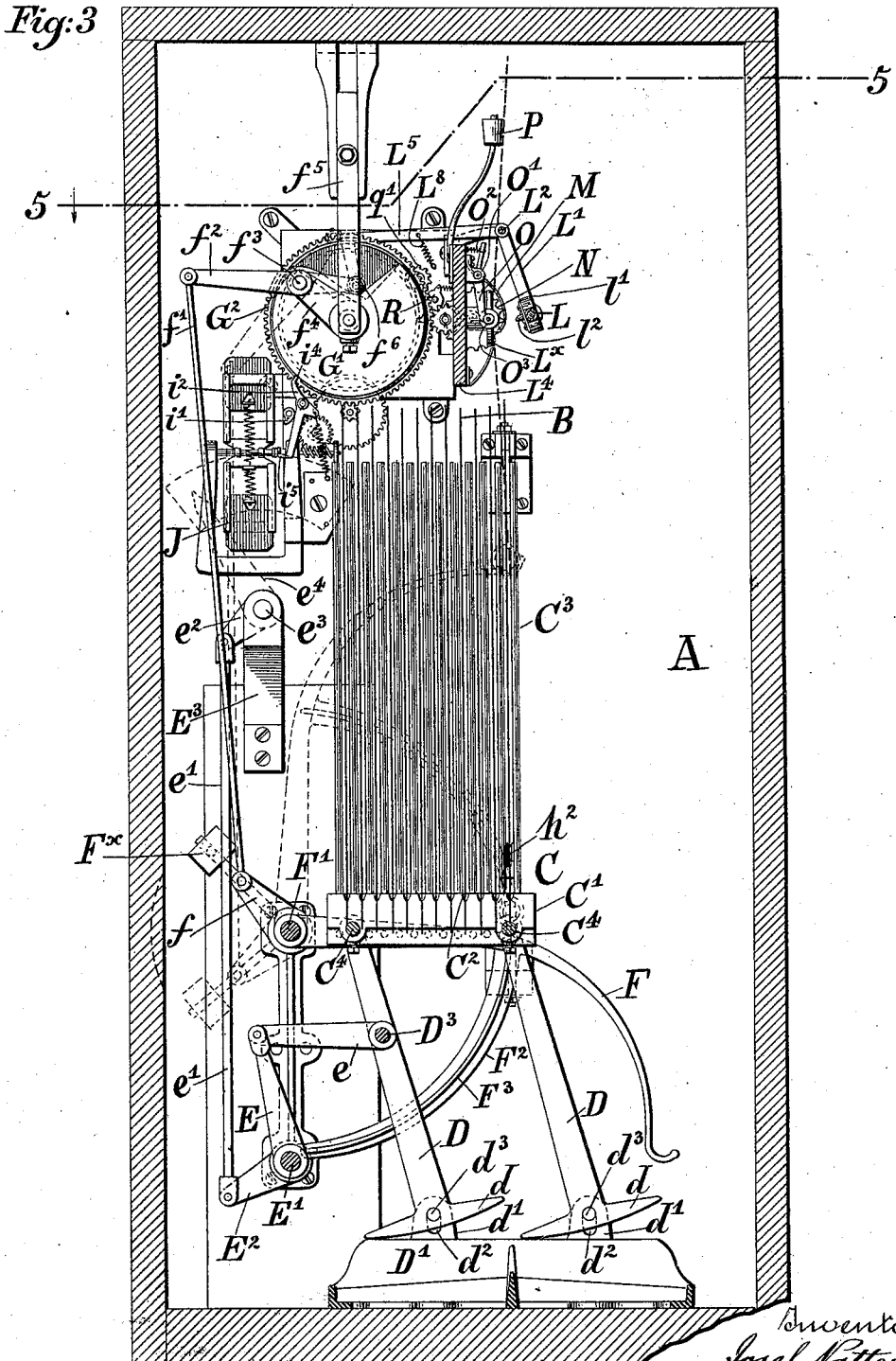
Figure 4:
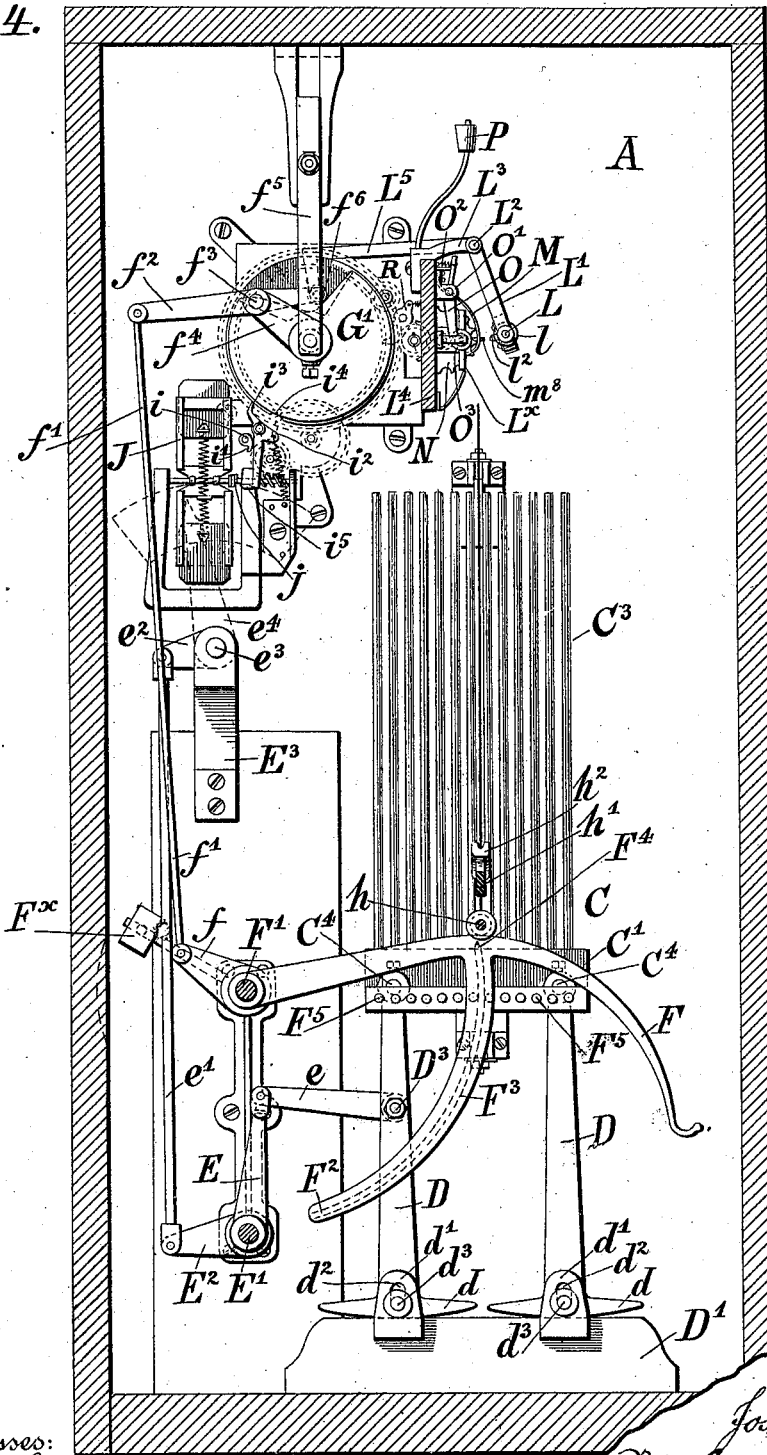
Figure 13:
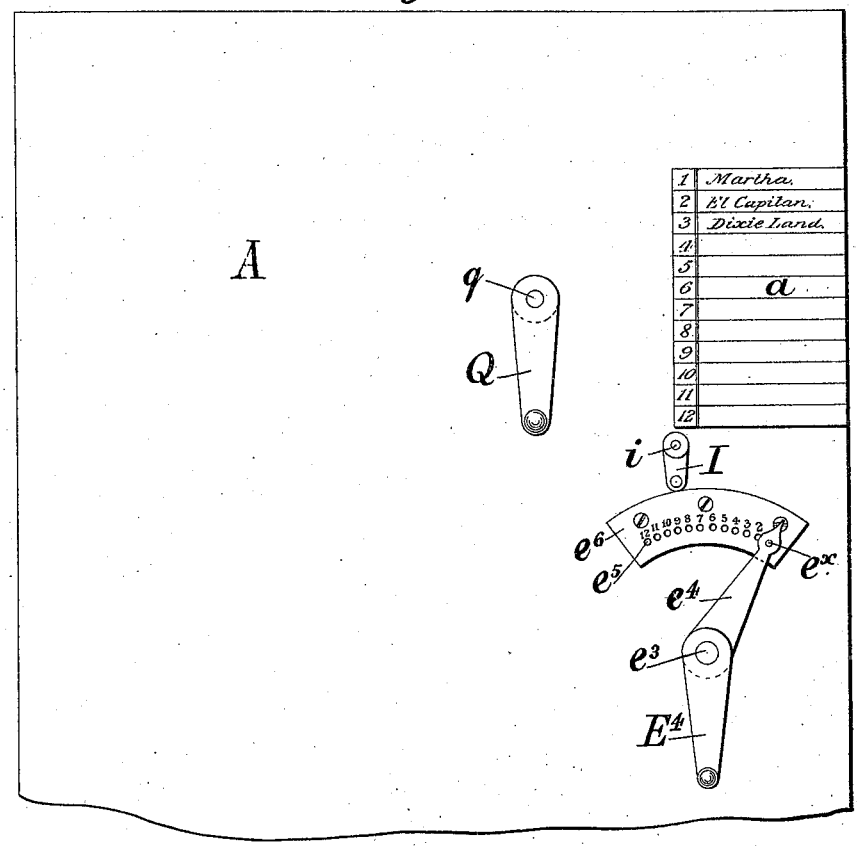
Figure 12:
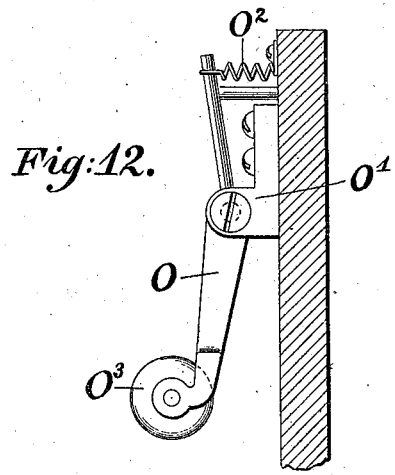

In the accompanying drawings, Figure 1 is a front elevation of the mechanism of my improved mechanical musical instrument, a portion of the note-sheets being broken away and the casing of the instrument being shown in section. Fig. 2 is a rear elevation of the same, the casing being in section. Fig. 3 is a side elevation of the mechanism of the instrument, the casing and some of the interior supporting parts being shown in section. Fig. 4 is a similar side elevation, showing the position of the magazine and the note-sheets carried thereby after one of the note-sheets has been selected, so as to be played, the same being taken on line 4 4, Fig. 5. Fig. 5 is a transverse section on the line 5 5 of Fig. 3. Figs. 6 and 7 are respectively a detail front elevation and a transverse section of the central portion of the note-sheet holder or clamping-bar, said views being enlarged. Fig. 8 is an enlarged detail showing the motor, the note-sheet holder, and other allied parts in their normal position. Fig. 9 is a similar view showing the same parts in operative position. Figs. 10 and 11 are detail views of the pinion driven by the motor, the driver or spur-wheel for the note-sheets, and the means for automatically disengaging the driver from the motor mechanism, Fig. 10 showing the parts disengaged and Fig. 11 showing them in engagement. Fig. 12 is a detail view showing the means for securing the central position of the note-sheet, the same being enlarged; and Fig. 13 is an elevation showing the winding-crank, list of pieces, and index and hand crank outside the case of the instrument.

Similar characters of reference indicate corresponding parts throughout the drawings.

Referring to the drawings, A indicates the casing of the music-box, which may be constructed in any suitable manner and which is provided on the manipulating side with a list or program $a$, showing the pieces of music which the instrument is capable of performing. (See Fig. 3.)

B indicates a set or series of note-sheets, which are constructed in any approved manner for the purpose of operating the star-wheels which sound the music-combs.

In the drawings a magazine or rack C is shown which has the capacity for holding twelve note-sheets; but it is evident that the capacity may be reduced or enlarged according to the desired capacity of the instrument. The magazine for supporting the note-sheets is composed of end supports C', which are notched out at $C^2$, so as to form recesses for receiving the edges of the note-sheets, which are maintained in parallel upright position by means of a series of parallel rods $C^3$, of which there is one series for each end support. The end supports C' C' are connected by transverse rods $C^4$, which pass loosely through the upper ends of the oscillatory or rock arms D, which at their lower ends are formed with rockers $d$, that rock upon the upper edges of the base-pieces D', secured to the bottom of the case A, said base-pieces being provided with upwardly-extending lugs $d'$, which are slotted out at $d^2$ for receiving pins $d^3$, that project from the rock-arms D into the said slots $d^2$. It is evident that the pins may be on the lugs and the slots in the rock-arms. There are two of the base-pieces D', and each one of the same has two rockers $d$ rocking thereupon, so that when the arms D are rocked in one or the other direction the magazine C is caused to move rectilinearly or in a plane. The before-described pin-and-slot connection is for the purpose of permitting the rockers to rock and at the same time to maintain them in position on the base-pieces D', it being evident that the pivot connection at $C^4$ of the plurality of rock-arms with the magazine always permits the magazine to be moved substantially in a horizontal plane. The more the arms D are inclined the farther the bearing-points of the rockers $d$ are toward their ends, and hence the nearer are the pins moved toward the opposite ends of the slots, so that the upper end of each rock-arm moves substantially in a straight line, depending on the curvature or shape of the head portions of the rockers. It is evident that the construction may be reversed—that is to say, the rock-arms may rock from the upper ends, the magazine being mounted on their lower ends. Two of the rock-arms are connected by a cross-rod $D^3$, to which is pivoted a link $e$, with one arm E of a bell-crank lever composed of lever-arm E, journaled shaft E', and lever-arm $E^2$, the other arm $E^2$ of said bell-crank lever being connected by means of a connecting-rod $e'$ with a crank-arm $e^2$ located on a short rock-shaft $e^3$, which is suitably journaled in a fixed bracket $E^3$ and in the casing of the instrument, and carries outside of the same a hand or pointer $e^4$ and a hand-crank $E^4$, said pointer or hand $e^4$ having a pin $e^\times$, adapted to be set into one of the series of holes or perforations $e^5$, that are arranged in a plate $e^6$, suitably attached to the case of the instrument, said holes or perforations being designated 1 to 12, inclusive, so as to correspond with the twelve pieces of music which are shown on the list or program $a$, in case the instrument has a capacity for playing twelve pieces of music. Upon operating the hand-crank $E^4$ so as to set the hand $e^4$ opposite one of the numbers designating the piece of music which is to be played the rock-arms D are oscillated on their rockers $d$ through the medium of the connection $e^2$, $e'$, $E^2$, E', E, and $e$, thereby imparting a corresponding movement to the magazine C, causing it to move substantially rectilinearly and moving the selected disk from, say, the position shown in Fig. 3, which is the normal position, to the position shown in Fig. 4, so that the selected disk may be raised to the music-box mechanism by means of the instrumentalities now to be described.

F F indicate a pair of arcuate arms which are mounted upon a counterbalanced rock-shaft F', which is journaled in suitable bearings of the casing A and is provided with a crank-arm $f$, which is connected by means of a connecting-rod $f'$ with a cam-lever $f^2$, which is pivoted at $f^3$ upon a supporting-bracket $f^4$, suitably fixed to the support or hanger $f^5$ for the spring-motor G of the instrument.

$F^\times$ is the counterbalancing-lever on the rock-shaft F'.

The spring-motor G is provided at one end with a cam G', which acts upon an antifriction-roller $f^6$ at the end of the cam-lever $f^2$.

The arcuate arms F bear upon a pair of grooved rollers $h$, which are arranged on slides H, that are guided on suitable rails H', said rails extending in the direction in which the note-sheet is to be moved into playing position, and said slides H being provided with arms $h'$, having at their outer ends grooved blocks or seats $h^2$, which are adapted to receive the peripheries of the note-sheets. It will be observed that upon starting the motor G the cam-lever $f^2$ will be oscillated by cam G' and a corresponding oscillation imparted to the arcuate arms F, thereby acting to cause the grooved seats or blocks $h^2$ to engage that note-sheet which has been selected and moved transversely to position in the manner before described.

It may sometimes happen that after the operator of the instrument has moved the hand or pointer $e^4$ opposite one of the numbers on the plate $e^6$ it may be accidentally shifted or it may not have been moved exactly opposite said number. To overcome this, I have made provision for a safety mechanism which causes the selected disk to settle to the exact position which should be obtained previous to the moving of the music-disk or note-sheet into playing position. This safety mechanism consists of horns $F^2$, which extend from the arms F and are each provided at one side with a rib $F^3$, having at the extremity adjacent each of the said arms F a taper or point $F^4$, which in the normal position of the magazine C lies slightly to one side of the plane of a series of safety-pins $F^5$, that project from the end supports of the magazine C. These safety-pins $F^5$ correspond in number with the parallel guide-rods $C^3$ and are arranged in the same plane therewith. Through the medium of these provisions the magazine C will be automatically slightly shifted or settled sidewise, if necessary, by the entrance of the tapering ends $F^4$ of the ribs $F^3$ between the safety-pins $F^5$, said ribs $F^3$ being formed on a curve concentric with the shaft F' of the arms F, so that during the operation of the arms F and while the ribs $F^3$ are in engagement with said pins $F^5$ the magazine will be maintained in proper position and will be held steady, so that it cannot wabble. The construction and arrangement of said parts are such that the exact position for the magazine, and in consequence thereof the selected note-sheet, is obtained before the arcuate arms F engage with the rollers $h$ on the note-disk-shifting slides H.

I indicates a small crank on the outside of the case A, the pivot-shaft $i$ of which is provided with a small cam $i'$, which is in engagement with a detent $i^2$, suitably pivoted to the case A, and the toe $i^3$ of which detent is normally in engagement with the notch $i^4$ in the barrel of the spring-motor G. Said detent $i^2$ is connected with and releases the governor J through the medium of the governor-detaining portion $j$, with which the hooked portion $i^5$ of said detent engages in the well-known manner. I do not limit myself to a governor of the form shown, as it constitutes no portion of the present invention.

Fixed between the large motion-transmitting gear-wheel $G^2$ on the motor G, which is connected with the governor by a suitable gear-train and the winding-gear $G^3$, is a cam K, (shown more fully in Figs. 8 and 9,) which is for the purpose of actuating the note-sheet holder or clamping-bar now to be described.

L is a clamping-bar, which is provided in the usual way with a number of antifriction-rollers $l$, which bear upon the note-sheet, said clamping-bar being carried by rock-arms L', which are mounted on a shaft $L^2$, that has bearing in suitable brackets $L^3$, that are mounted on the main casting or music-comb support $L^4$. A lever $L^5$ is carried also by said shaft $L^2$ and is provided with an angularly-bent portion $L^6$, that carries an antifriction-roller $L^7$, that is adapted to move into the cam-recess $k$ and to travel upon the periphery of the cam K. The said clamping-bar L carries at about its mid-length, as shown more clearly in Figs. 6 and 7, a head $l'$, which is suitably secured to the clamping-bar, as by rivets or other fastenings, said head supporting a centering-pin $l^2$, which penetrates into a socket-piece $L^\times$ on the plate $L^2$ and is adjustably mounted on the head by means of headed pins or studs $l^3$ on the head, which pass through longitudinal slots $l^4$ in a mount $l^5$ for the centering-pin $l^2$. By this construction it is possible by loosening the screw-threaded headed studs $l^3$ to adjust the centering-pin $l^2$ to required position, after which the headed studs are again tightened. With the exception of the adjustable centering-pin this particular clamping-bar is not new, and I do not therefore claim the same, except in so far as improvements thereon are disclosed herein. The cam-lever $L^5$ is actuated by means of a spring $L^8$, which draws the antifriction-roller $L^7$ down into the recessed portion $k$ of the cam K. The object of this form of clamping mechanism is by reason of the fact that the centering-pin $l^2$ moves in a curve to draw the selected note-sheet slightly away from the recessed blocks $h^2$, which have lifted the note-sheet, thereby obviating any friction of the note-sheet with said blocks or seats. The adjustability of the centering pin or pivot transversely to the axis of the note-holder or clamping-bar L enables the centering-pin to be adjusted and set after the instrument is put together, so that freedom from friction of the note-sheet upon the recessed blocks $h^2$ while being rotated is secured.

M is a light spring of curved shape suitably fastened at one end to the supporting-plate $L^4$, so that it humps up in front of the same, its free end being turned inwardly toward the said plate. In Fig. 1 this spring is shown as located to one side of the music-combs M'. The object of this spring is to hold the tune-sheet while it is being shifted to playing position previously to its being penetrated by the centering-pin $l^2$ away from the spur-wheel or driver and from the star-wheels. The said driver or spur-wheel for the note-sheets is indicated by N, and the manner of supporting the same is shown clearly in Figs. 3, 8, 9, 10, and 11.

It frequently happens that in instruments of this class when the note-sheet is being moved into playing position the spur-wheel or driver is engaged thereby, so as to injure some of the parts; but in the present invention I have devised means whereby the note-sheet is kept out of contact with the spur-wheel or driver until the note-sheet is clamped, whereupon said spur-wheel is caused to automatically drive the sheet around and play the tune. The spur-wheel or driver N is mounted on a short shaft $m$, which carries a pinion $m'$, said shaft $m$ turning within a shiftable box $m^2$, guided in a suitable slot $m^3$ in a guide-piece $m^4$, that is suitably mounted on the pivot or stationary shaft $m^5$ of the motor-pinion $m^6$, which is in constant mesh with the gear-wheel $G^2$ of the motor. The said box $m^2$ is actuated by a spring $m^7$, which is confined within the slot $m^3$, the function of said spring being to protrude an actuating-pin $m^8$ on box $m^2$ through one end of the support $m^4$. The said pin $m^8$ projects into the path of movement of the clamping-bar L, so that it may receive the thrust of one end of said clamping-bar, by which movement the box $m^2$ is pushed inwardly, so as to cause the pinions $m'$ and $m^6$ to intermesh, at which time the spur-wheel N is automatically rotated and the note-sheet driven around. The described construction whereby the spur-wheel N is caused automatically to be driven by the motion-transmitting mechanism and whereby the same is caused to be automatically disconnected therefrom and rendered idle when the pressure of the clamping-bar is removed is a valuable feature of the present invention.

As a safety device to provide that the selected and removed note-sheet may be properly centered when the centering-pin $l^2$ is moved into the same I have provided, as shown in Figs. 3, 4, and 12, a safety device, which consists of a lever O, pivoted intermediately of its ends on a bearing-piece O', which is fixed to the plate $L^4$, one end of said lever being connected with an actuating-spring $O^2$, while the other end of the lever carries a small roller $O^3$. The spring $O^2$ normally throws the roller $O^3$ out into the path of the selected note-sheet which is being shifted to playing position, so that the peripheral portion of the note-sheet rides over the said roller, which when a slot $b$ in the note-sheet arrives opposite the same immediately enters the said slot or opening $b$ and secures the central position of the note-sheet, so that when the clamping-bar flexes the note-sheet, as shown in dotted lines in Fig. 3, the note-sheet will travel around upon the roller-support P without any undue straining or friction and there will be an easy motion of the parts that will not be transmitted in objectionable sounds to the listeners.

It is to be understood that the mechanism is so constructed and arranged as that the note-sheet before being centered in playing position is liable to be shifted or turned around in the supporting-seats $h^2$ to a very slight extent without at any time shifting the center of the note-sheet so that the center-pin cannot enter the center hole. It is for the purpose of overcoming such slight rotary shifting of the note-sheet that the roller $O^3$ is used. In practice the note-sheet is never shifted on its center under ordinary circumstances so much that the roller $O^3$ cannot more or less directly enter the recess $b$ in the periphery of the note-sheet, and consequently the roller on entering the recess $b$ of a slightly-shifted note-sheet will settle in true engagement with the note-sheet and secure the exact playing position of the same. In reality the roller $O^3$, in combination with the recessed note-sheet, is principally intended for securing a little more accuracy in the setting of the note-sheet into playing position, as the note-sheet is never supposed to shift on its center so much as that the roller will not enter the recess more or less squarely.

Q indicates the motor-winding crank, mounted on the winding-shaft $q$, which has bearing in the case A and carries a pinion $q'$, the teeth of which mesh with the gear-wheel $G^3$ on the motor-shaft.

R is a detent actuated by a spring R', which normally causes its toe to take between the teeth of gear-wheel $G^3$ and prevent backward rotation of the latter, said detent being automatically disengaged from the teeth when the motor is being wound up.

The operation of the music-box described is as follows: The operator takes hold of the hand-crank $E^4$ of the selecting device and moves the hand $e^4$ opposite a number on the plate $e^6$ which corresponds with the number of the piece of music on the list or program $a$ which is desired to be played. Simultaneously with the act of selecting the piece of music and setting the hand $e^4$ the hand-crank $E^4$ acts, through the medium of the connections $e^2$, $e'$, E, and $e$, to move the magazine C, in the manner before described, on its rocking supports D. Preferably keeping hold of the hand-crank $E^4$, so as to maintain the desired position of the hand $e^4$, the operator now takes hold of the crank I and releases the governor J, so that the motor G can act; but it is evident that the governor may be released by a coin in any well-known way. Previous to the action of the motor the movements are accomplished by hand; but after the motor starts the remainder of the work is done automatically. The motor having been started, the cam-lever $f^2$ is caused to be actuated by the cam $G'$ and the arcuate arms F are oscillated, first causing the tapering ends of the truing-ribs $F^3$ on the horns $F^2$ to enter between the proper safety-pins $F^5$, so as to set the magazine and hold it steady, and immediately thereafter the upper edges of the arms F come in contact with the rollers on the slides H, thereby bringing the blocks $h^2$ against the selected note-sheet and lifting the note-sheet up to proper position for being centered so as to play the piece. The cam K, which actuates the clamping-bar L, is so timed as that just as soon as the cam $G'$ has finished its work the said cam K will by its cam-surface $K'$ act on the roller end of the lever $L^5$ and force the note-sheet holder or clamping-bar L inwardly, as shown in Fig. 9, so that it will be drawn against the selected note-sheet and its centering-pin caused to penetrate the central orifice of the note-sheet. Simultaneously with the inward movement of the clamping-bar the same comes in contact with the protruding end of the spur-wheel or driver actuating pin $m^3$ and pushes the pinion $m'$ into engagement with the motion-transmitting pinion $m^6$, which is driven from the motor. As soon as this has been done the motor imparts its motion to the spur-wheel or driver N and causes the same by its engagement with the peripheral openings or projections, as the case may be, on the note-sheet to drive the note-sheet around, so that the latter will actuate the star-wheels and in turn sound the music-combs. When the piece of music has been played, the lever $L^5$ of the clamping-bar enters at its roller end $L^7$ into the cam-recess $k$, so that actuated by the spring $L^8$ the clamping-bar releases the note-sheet, and simultaneously with the release of the note-sheet the spring $m^7$ releases the pinion $m'$ from the motor-driven pinion $m^6$, thereby immediately stopping the action of the driver or spur-wheel N on the note-sheet. The motor, however, continues to move, so that the recess of the cam $G'$ will receive the roller end of the cam-lever $f^2$, thereby permitting the weight of the parts to lower the note-sheet in its proper position in the magazine, which is maintained in such position by reason of the locking of the ribs $F^3$ with the safety-pins. After the piece of music has been played the motor will be stopped by the detent $l^3$ entering the notch in the motor-barrel. As soon as the locking-ribs $F^3$ have been released from the safety-pins the magazine C may be shifted by the selection of another piece of music.

It is evident that changes in the mechanical details are within the scope and spirit of my invention, and I do not limit myself to the exact mechanism shown and described.

Having thus described my invention, what I claim as new is—

1. The combination, with a note-sheet magazine and rocker-supports on which the magazine is mounted to move bodily sidewise, of hand-operated mechanism for moving said magazine, and means for feeding the selected note-sheet to playing position, substantially as set forth.

2. The combination, with a note-sheet magazine, base-pieces, and supports, oscillating on said base-pieces, and at the upper ends of which the magazine is arranged, mechanism for moving said magazine, and selecting a note-sheet, and means for feeding the selected note-sheet to playing position, substantially as set forth.

3. The combination, with a note-sheet magazine, of rocker-supports on which the magazine is mounted to move bodily sidewise, a selecting device, means connecting said selecting device with the rocker-supports, and means for imparting simultaneous motion to the selecting device and magazine, substantially as set forth.

4. The combination, with a note-sheet magazine mounted on rockers so as to move in a plane, of mechanism connected therewith for simultaneously shifting said magazine and selecting one of the note-sheets supported by the magazine, substantially as set forth.

5. The combination, with a note-sheet magazine, provided with a series of safety-pins, and with parallel note-sheet-separating rods, there being two series of rods and two series of pins, the successive pins being in the same planes with the successive rods, and means interlocking with said pins for setting the magazine in proper position, substantially as set forth.

6. The combination, with a note-sheet magazine, provided with safety-pins, of an arm provided with a rib adapted to enter between said safety-pins, means for operating the magazine, and means for operating said arm, substantially as set forth.

7. The combination, with a note-sheet magazine, provided with safety-pins, and means for shifting said magazine, of an arm provided with a rib adapted to enter between said safety-pins, a motor, and means for operating said arm automatically from the motor, substantially as set forth.

8. The combination, with a note-sheet magazine, and the means for selecting a note-sheet and simultaneously shifting the magazine, of a safety mechanism interlocking and positively engaging with the magazine to maintain the desired position of the same during any position of the note-sheet being raised or lowered, substantially as set forth.

9. The combination, with a note-sheet magazine, and means for shifting the magazine, of actuating-arms below the magazine, a motor for oscillating said arms, and lifting-slides for the note-sheet, operated by said arms, substantially as set forth.

10. The combination, with a note-sheet magazine, and means for shifting the magazine, of a pair of arcuate pivoted arms, a motor, means for oscillating the arms from the motor, note-sheet-lifting slides, and rollers on said slides, engaged by said arms, substantially as set forth.

11. The combination, with a note-sheet magazine, and means for shifting said magazine, said magazine being provided with safety-pins, of a pair of pivoted arcuate arms, horns carried by said arms and provided with curved ribs concentric with the fulcrum of the arms, said ribs being adapted to enter between the safety-pins, a motor, and means for connecting the arms with the motor, and note-sheet-shifting slides actuated by said arms, substantially as set forth.

12. The combination, with a note-sheet for music-boxes, of the clamping-bar, provided with a centering-pin forming the pivot for the note-sheet, said pin being adjustable transversely to the bar, oscillatory arms attached to the ends of said bar, and means for oscillating said arms, substantially as set forth.

13. The combination, with a note-sheet for music-boxes, said note-sheet having a recess or hole located near the circumference of the same, and means for shifting the note-sheet to playing position, of a yielding centering device adapted to enter said recess, substantially as set forth.

14. The combination, with a note-sheet for music-boxes, said note-sheet having a recess or hole located near the circumference of the same, and means for shifting the note-sheet to playing position, of a spring-actuated roller adapted to enter said recess, substantially as set forth.

15. The combination, with a note-sheet for music-boxes, said note-sheet having a recess or hole located near its circumference, and means for shifting the note-sheet to playing position, of a pivoted lever, a spring acting on one end of said lever, and a roller mounted on the other end of the lever, and adapted to enter said recess, substantially as set forth.

16. The combination, with a note-sheet for music-boxes, means for shifting the same to playing position, and the driver or spur-wheel, of a spring fixed to the music-comb support and projecting in advance of and located in juxtaposition to the driver or spur-wheel, so as to temporarily hold the note-sheet out of contact with the said driver, substantially as set forth.

17. The combination, with the motor and its driven pinion, of a stationary guide-piece located near said pinion, a spring-actuated box sliding in said guide-piece and provided with an actuating-pin projecting through one end of said box, a pinion mounted on said box and maintained normally out of engagement with the other pinion, a note-sheet driver or spur-wheel carried by the shiftable pinion, and means for engaging said projecting pin so as to shift the note-sheet driver or spur-wheel, substantially as set forth.

18. The combination, with the motor and its driven pinion, of a stationary longitudinally-slotted guide-piece located adjacent to said pinion, a box movable in the slot of said guide-piece, a spring acting on one side of said box, a pin projecting from the other side of said box, and protruding through said guide-piece so as to extend beyond the normal playing position of the note-sheet, a short shaft carried by said box, a pinion and a note-sheet driver or spur-wheel mounted on said shaft, and means for engaging said projecting pin so as to actuate the said box and engage said pinions, substantially as set forth.

19. In a music-box with exchangeable note-sheets, a note-sheet magazine, and oscillatory supports constructed to support the magazine from one end and to rock from their other ends, substantially as set forth.

20. In a music-box with exchangeable note-sheets, a note-sheet magazine, and oscillatory supports rocking from their lower ends and supporting the magazine at their upper ends, substantially as set forth.

21. In a music-box with exchangeable note-sheets, a note-sheet magazine, base-pieces, and oscillatory supports mounted on the base-pieces and on the upper ends of which the magazine is in turn mounted, substantially as set forth.

In testimony that I claim the foregoing as my invention I have signed my name in presence of two subscribing witnesses.

JOSEF NATTERER.

Witnesses:
GEO. L. WHEELOCK,
GEO. C. GEIBEL.